(12) United States Patent
Martinez et al.

(10) Patent No.: US 6,426,497 B1
(45) Date of Patent: Jul. 30, 2002

(54) METHOD AND SYSTEM FOR OPTICAL DISTANCE AND ANGLE MEASUREMENT

(75) Inventors: Steven D. Martinez, Corrales; William Mark Blevins; John Russell Kabler, both of Albuquerque; Lonny Wayne Rakes, Rio Rancho, all of NM (US); Jeffrey Norman Schoess, Buffalo, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/476,392

(22) Filed: Dec. 30, 1999

(51) Int. Cl.[7] .................................................. G01D 5/34

(52) U.S. Cl. ............................ 250/231.14; 250/237 G; 73/650

(58) Field of Search .......................... 250/231.13, 23.14, 250/231.17, 231.1, 237 G; 341/13, 31; 73/650

(56) References Cited

U.S. PATENT DOCUMENTS

| | | | | |
|---|---|---|---|---|
| 5,438,882 A | * | 8/1995 | Karim-Panahi et al. ...................... | 73/862.324 |
| 5,612,544 A | * | 3/1997 | Busch ......................... | 250/556 |
| 5,734,108 A | * | 3/1998 | Walker et al. ................ | 76/650 |

FOREIGN PATENT DOCUMENTS

| | | | | |
|---|---|---|---|---|
| DE | 4402401 A1 | 1/1994 | .......... | G01D/5/244 |
| JP | 56130603 | 10/1981 | ........... | G01B/11/00 |
| WO | WO 95/23325 | 8/1995 | ............. | G01L/5/16 |

OTHER PUBLICATIONS

Locke, R. J.; Hicks, Y.R., Anderson, R.C., Zaller, M.M.; "Fuel Injector Patternation Evaluation In Advanced Liquid–Fueled, High Pressure, Gas Turbine Combustors, Using Nonintrusive Optical Diagnostic Techniques," Oct. 1997; pp. 1–15; NASA Tech Briefs LEW–16701.

Rosakis, A. J.; Singh, R. P.; Tsuji, Y.; Kolawa, E.; Moore, Jr., N. R.; "Full Field Measurements of Curvature Using Coherent Gradient Sensing: Application To Thin Film Characterization;" pp. 1–40; Aug. 1998, NASA Tech Brief vol. 22, No. 8.

Yao, Shi–Kay; Asawa, Charles K.; "Fiber Optical Intensity Sensors;" pp. 562–575; Apr. 1983; IEEE Journal vol. SAC–1, No. 3.

Gallawa, R. L.; Goyal, I.C.; Ghatak, A. K.; "Fiber Spot Size: A Simple Method of Calculation;" pp. 192–197; Feb. 1993; Journal of Lightwave Technology, vol. 11, No. 2.

Rose, A. H.; Wyss, J. C.; "Self–Calibrating Optical Thermometer," pp. 142–148; SPIE vol. 2594.

Metz, Sara; Young, Matt (eds.); "Bibliography of NIST Publications on Multimode Optical Fibers," pp. 1–23; Dec. 1997; NISTIR 5070; National Institute of Standards and Technology.

(List continued on next page.)

Primary Examiner—Stephone Allen
Assistant Examiner—Bradford Hill
(74) Attorney, Agent, or Firm—Loria B. Yeadon (57) ABSTRACT

A contactless precision, optical distance and angle measurement method and system optically measuring the position of a moveable object, the bending of the object, the torque applied to the object and the object's rotational velocity. The present invention includes a plurality of optical sensors placed around and adjacent to the moveable object which transmit optical signals to a surface of the object and receives the optic signals when predefined marker means are sensed. The received optic signals are then processed by non-linear estimation techniques known to those of skill in the art to obtain the desired information.

27 Claims, 7 Drawing Sheets

OTHER PUBLICATIONS

Wang, C.M.; Vecchia, Dominic F.; Young, Matt; Brilliant, Nathan A.; "Software for Performing Gray–Scale Measurements of Optical Fiber End Faces," pp. 1–18; Nov. 1994; NIST Technical Note 1370, National Institute of Standards and Technology.

Day, G.W.; Franzen, D.L.; Hickernell, R.K. (eds.); "Technical Digets: Symposium on Optical Fiber Measurements, 1994," pp. 1–219; Sep. 1994; NIT Special Publication 864; National Institue of Standards and Technology.

Day, G. W.; Hale, P.D.; Deeter, M.; Milner, T.E.; Conrad, D.; Etzel, S.M.; "Limits to the Precision of Electro–Optic and Magneto–Optic Sensors," pp. 1–128; Mar. 1987; NBS/TN 1307; National Institute of Standards and Technology.

"Optical Power Line Voltage and Current Measurement Systems, vol. 1," Sep. 1987; EPRI EL 5431; National Bureau of Standards.

Booysen, Andre; Swart, Pieter; Lacquit, Beatrys; Spammer, Stephanus; "Wavelength Insensitive Fiber Optic Sensor Based On Axially Strained Fused Coupler," pp. 2788–2792; Oct. 1996; Society of Photo–Optical Instrumentation Engineers 35(10).

Warashina, Yoshihisa; Iida, Takashi; Ikeya, Tsuyoshi; Kyomasu, Mikio; "Single–mode Fiber–compatible Plastic–molded Surface–Contact Receptacles," pp. 3110–3116; Nov. 1996; Society of Photo–Optical Instrumentation Engineers 35(11).

Beadle, Brad M.; Weis, R. Stephen; Norwood, Curt A.; "Radial Strain–induced Attenuation in Plastic Optical Fiber," pp. 1696–1699; Jun. 1996; Opt Eng. 35(6).

Wang, Dong–Xue; Karim, Mohammid A.; "Self–referenced Fiber Optic Sensor Performance for Microdisplacement Measurement;" pp. 838–842; Mar. 1997; Society of Photo–Optical Instrumentation Engineers 36(3).

Morante, Miguel; Cobo, Adolfo; Lopez–Higuera, Jose Miguel; "New Approach Using A Bare Fiber Optic Cantilever Beam As A Low–Frequency Acceleration Measuring Element," pp. 1700–1706; Jun. 1996; Society of Photo–Optical Instrumentation Engineers 35(6).

Su, Wei; Gilbert, John A.; Morrissey, Mark D.; Song, Yuehong; "General–purpose Photoelastic Fiber Optic Accelerometer," pp. 22–28; Jan. 1997; Society of Photo–Optical Instrumentation Engineers 35(1).

Remo, John L.; "Solid State Optic Vibration/Displacement Sensors," pp. 2798–2803; Oct. 1996, Society of Photo–Optical Instrumentation Engineers.

* cited by examiner

METHOD AND SYSTEM FOR OPTICAL DISTANCE AND ANGLE MEASUREMENT

FIELD OF THE INVENTION

The present invention relates generally to the field of sensors, and more specifically, to the use of fiber optic sensors for determining spatial distance, speed and relative angular displacement of a moveable object.

BACKGROUND OF THE INVENTION

In the commercial and defense industries, users are demanding technology integration that increases product life, simplifies operation and maintenance, and provides integration that improves safety and reliability. However, any technology offered must also support a positive, quantitative cost/benefit analysis.

Fiber optic sensors have been used for the measurement of relative position for decades, but, until the present invention, their utility has not been extended to self-calibrating, precision absolute, position measurement systems. While conventional systems using fiber optic sensors offer only a relative measurement capability, they usually require repetitive calibration between uses because they are sensitive to the angle of the surface being measured and the distance between the sensor and the surface being measured. Indeed, some of those skilled in the art may believe that precision absolute position measurement systems could not be accomplished with fiber optic sensors.

Most sensor prognostic systems require exorbitant amounts of processing power for determining statistical probabilities or require precise measurements of physical properties for which current sensor technology does not exist. For example, in prognostic measurements of a moveable shaft (such as may be found in an aircraft engine or similar vehicle engine), the operational characteristics of the shaft must be known to ensure safe aircraft operation. Some operational characteristics required include monitoring of shaft lateral displacement, shaft misalignment, shaft speed and torque, all characteristics which are difficult or impossible to capture with current noncontact sensor technology. These characteristics may be necessary to determine in such applications as turbogenerators, power generation stations, ships, submarines and earth moving equipment.

The need to measure drive shaft alignment has existed for some time. In flexible or fairly rigid structures, a moveable shaft (for example, one that is rotating) can move out of alignment, bend beyond its stress points or move off a set axis, thereby resulting in a damaged structure, engine or system. For example, aircraft safety depends in part on determining the drive's operational characteristics as torque is transmitted to any engine component. Further, the shaft's attitude and bending characteristics needs to be non-invasively measured, as well as the shaft's rotational speed and torque. Movement, either from the shaft attitude or the bending, needs to be measured to less than 0.01 inches (i.e., 10 mils) and the RPM and the torque further needs to be monitored.

Two known previous technical approaches to measuring and monitoring the shaft have been unsuccessful. For example, Lucent Technologies attempted to use an eddy-current sensor, however, measurements based on eddy-current sensing did not provide the accuracy, environmental tolerance, or robustness required for this or similar applications. Others have attempted a design concept that required a magnetic slug embedded in the torque couplers. However, this method similarly proved unsuccessful.

Thus, there is a need for a non-obtrusive system that optically measures movement of a large drive shaft or torque coupler in the confined space of an engine such as, for example, an aircraft. The sensor system must not interfere with airflow into the engine, and must accommodate various environmental conditions (such as, for example, high vibration, shock and high temperature conditions). Preferably, the sensor must also be placed between 150 mils and 500 mils from a surface of the face of the drive shaft or coupler assembly due to space constraints. The sensor system must also be capable of capturing absolute measurement of the shaft's movement without calibration. Moreover, the measurement data obtained by the sensor system should be capable of determining movement of 10 mils or less in the application as the shaft rotates up to 9000 revolutions per minute (RPM). The system should also preferably measure rotation of the shaft at greater than 9000 RPM as well as twisting of the moveable shaft in order to calculate torque. The system should also be able to measure absolute distance from each sensor to a surface on the torque coupler knowing that the surface may vary not only in axial distance away from the sensors but also in complex angles relative to the sensors. The ability to non-obtrusively measure absolute movement versus relative movement, high-resolution shaft displacement, and twisting in the moving shaft has never been accomplished before the present invention.

A self-calibrating, precision absolute position measuring system, such as disclosed in the present invention, is also supported by the defense community. The Secretaries of the Army, Navy and Air Force have all directed, by policy, that new procurements must incorporate diagnostic and prognostic system health management prior to funding approval. This has been emphasized in new development programs including the Crusader for the Army, the Advanced Amphibious Attack Vehicle for the Marines, and the Joint Strike Fighter (JSF) for the joint services. However, until the present disclosure, there was a gap between the need and the technology available to meet that need.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention comprises a non-invasive precision, optical distance and angle measurement system which optically measures the position of a moveable object (such as a shaft in an engine), the bending of the moveable object, the torque applied to the object and the object's rotational velocity. The present invention includes a plurality of optic sensors placed around and adjacent to the object which transmit optic signals via fiber optic bundles to a target marker means on a surface of the object and receives the optic signals when the target marker means are sensed. The received optic signals are then processed by non-linear estimation techniques known to those of skill in the art to obtain the desired information. The present invention is intended for vehicular engines (such as are found in commercial or military aircraft), but can be applied to other applications, such as, for examples, in tanks, power generation equipment, shipboard power plants and other applications to requiring moveable machinery.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 4b illustrates the multifaceted target markers as shown in FIG. 4a;

DETAILED DESCRIPTION OF THE INVENTION

The present invention is a precision, non-invasive optical distance and angle measurement system which, by a plurality of sensor assembly means, transmits optical signals to predefined surface areas on a moveable torque coupler or like structure, measures the reflectance of the optical signals and by a signal processing software means which accounts for the sensor and target models, and processes the desired information relating to the shaft's operational characteristics.

Figure 1:
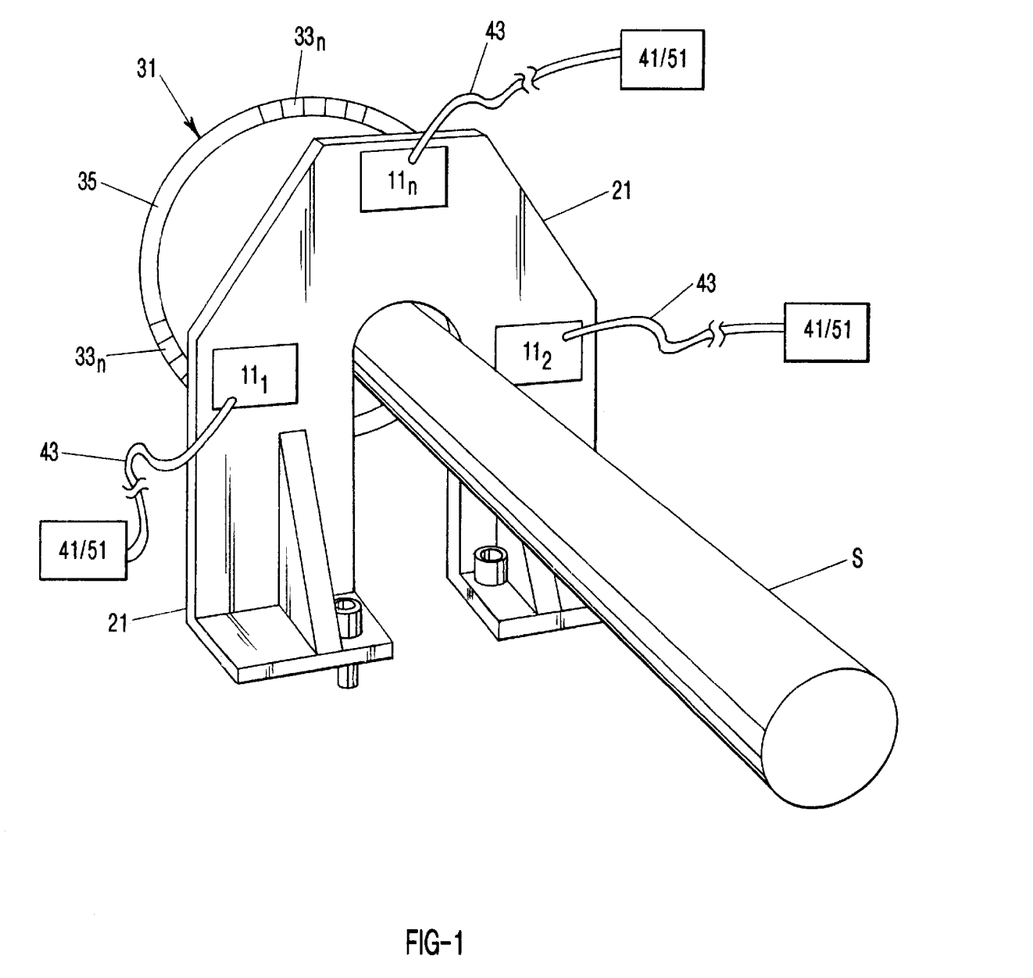
FIG. 1 is aside perspective view of one embodiment of the present invention attached to a mounting structure which partially surrounds a moveable shaft attached to a torque coupler.

Referring to FIG. 1, the present invention includes a plurality of optic sensor assembly means $11_1$–$11_n$ placed on at least one mounting structure 21 adjacent to a torque coupler 31 which engages and surrounds a moveable shaft S; at least one stepped target marker means $33_n$ attached preferably to a surface 35 of the torque coupler 31 or alternatively directly to a surface of the shaft S; control electronics 41 communicating with each optic sensor assembly means $11_n$ via communications bus 43; and signal processing software means 51 loaded and stored in control electronics 41.

As seen in FIG. 1, each sensor assembly means $11_n$ is attached to a mounting structure 21 of conventional design which is proximately adjacent to a torque coupler 31 attached to a moveable shaft S. Each sensor assembly means $11_n$ is preferably placed equidistantly on mounting structure 21 and thus, circumferentially around the moveable shaft S. In the preferred embodiment, three sensor assembly means $11_1, 11_2, 11_n$ are placed evenly around shaft S as seen in FIG. 1, however, those of skill in the are will realize that as little as two sensor assembly means could be used to accomplish the results dictated by the present invention. Each sensor assembly means $11_1$–$11_n$ is preferably disposed between 0.15 and 0.4 inches away from the surface face 35 of the moveable torque coupler 31. Each sensor assembly means $11_1$–$11_n$ is also preferably a conventional fiber optic concentric ring-type sensor, which has multiple fiber optic bundles per sensor, and more specifically, is a fiber-optic sensor which transmits optical signals to the surface 35 of the torque coupler 31, which receives optical signals from a target marker means $33_n$ formed on or attached to surface 35, and which transmits voltages corresponding to shaft information to the control electronics 41 for processing by the signal processing software means 51. However, those of skill in the art will realize that other sensors could be used (such as, for example and without limitation, other coherent light sensors, non-coherent light sensors, incandescent sensors, wide band sensors, multiple wavelength sensors or other fiber optic sensors) and remain within the spirit of this invention. As each target marker means $^{33}$n rotationally passes each sensor assembly means $11_1$–$11_n$, each sensor assembly $11_1$–$11_n$ continuously, and thus in real-time, measures reflected light from the moveable surface 35 based on the intensity of the reflected transmitted optical signal when the transmitted signal reflects off of any of the target marker means $33_n$. Thus, in the preferred embodiment, three precise distances to the measured surface 35 can be obtained so that the attitude of the measured surface 35 (and thus, the coordinate plane of the coupler) can be estimated relative to a fixed reference coordinate system, thereby allowing direct measurements of the shaft's S coordinate angular displacement and distance from each sensor assembly means a $11_1$ relative to each sensor assembly means $11_n$.

Figure 2:
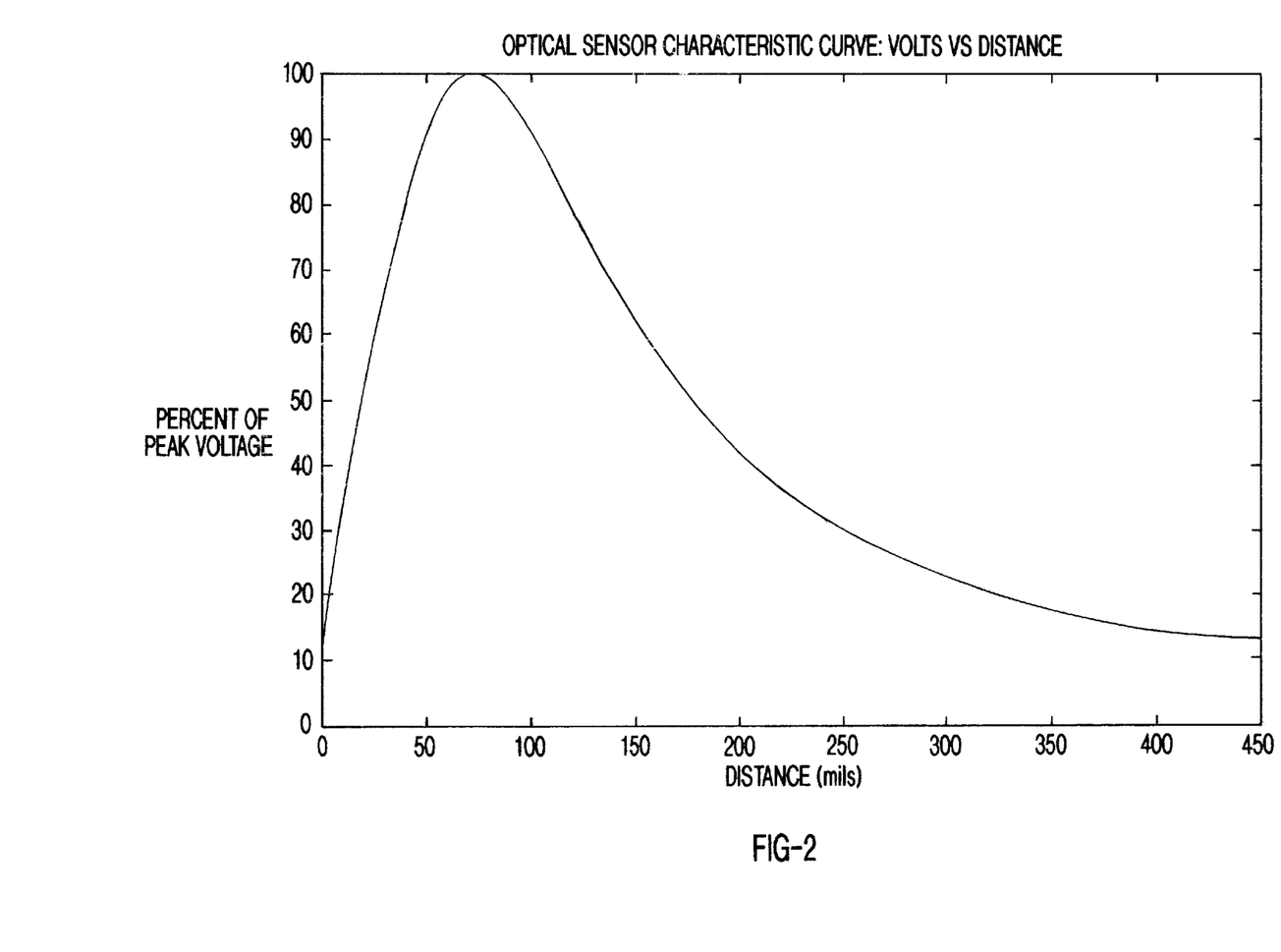
FIG. 2 graphically illustrates the response curve from a commercially available fiber optic concentric ring-type sensor.

Typical concentric ring fiber optic sensors (such as the type preferred in the present invention) utilize a central bundle of illuminator transmit fibers surrounded by a concentric ring of sense fibers which are coupled to a photonic detector. Invasively moving the concentric ring sensor a distance relative to a reflective surface provides a detected response curve characteristic similar to that illustrated in FIG. 2. Applications which employ commercially available sensors that exhibit this type of response curve utilize only the linear portions near either side of the peak of this response curve as illustrated in FIG. 2, the linear range of a typical commercial fiber optic sensor being about 100 mils. However, use of the operational characteristics of the linear portion of this curve severely limits the operational range of the sensor assembly means, and further, provides no means for absolute calibration of the sensor. The present invention, in contrast, employs the non-linear operational characteristics of this curve for data processing by the signal processing software means 51.

Figure 3:
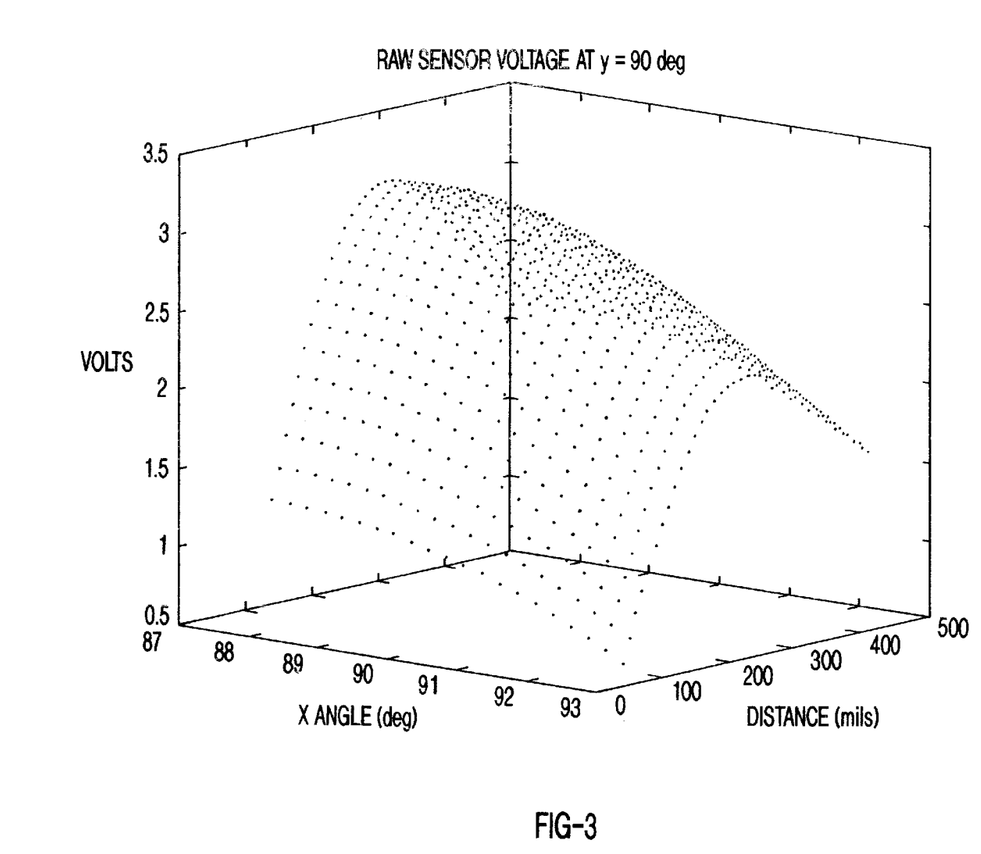
FIG. 3 is a three-dimensional plot of the response of a concentric ring fiber optic sensor. This shows the sensitivity of the sensor to distance and angle variations and shows the non-linear characteristics of the sensor to these variations.

Referring to FIG. 3, FIG. 3 illustrates a three-dimensional plot of the response of a concentric ring fiber optic sensor of the type preferred in the present invention. As shown, this type of sensor is highly sensitive to angle variations, and thus, the effects of small angle changes on the characteristic response of such a sensor must be modeled in order to achieve the level of precision desired. The characteristic response is also a function of the reflecting surface material. Thus, when using these types of sensors, it is preferred that a three-dimensional response (or map) of each sensor first be captured and modeled. This can be accomplished, for example, by placing, each sensor in an automated high precision fixture and capturing the response of each sensor from a known target material as the automated characterization system varies the distance and the two orthogonal angles of the sensor relative to the characterization target facet. The resulting mapped information can then be stored in the signal processing software means 51 for subsequent calculations.

Figure 4A:
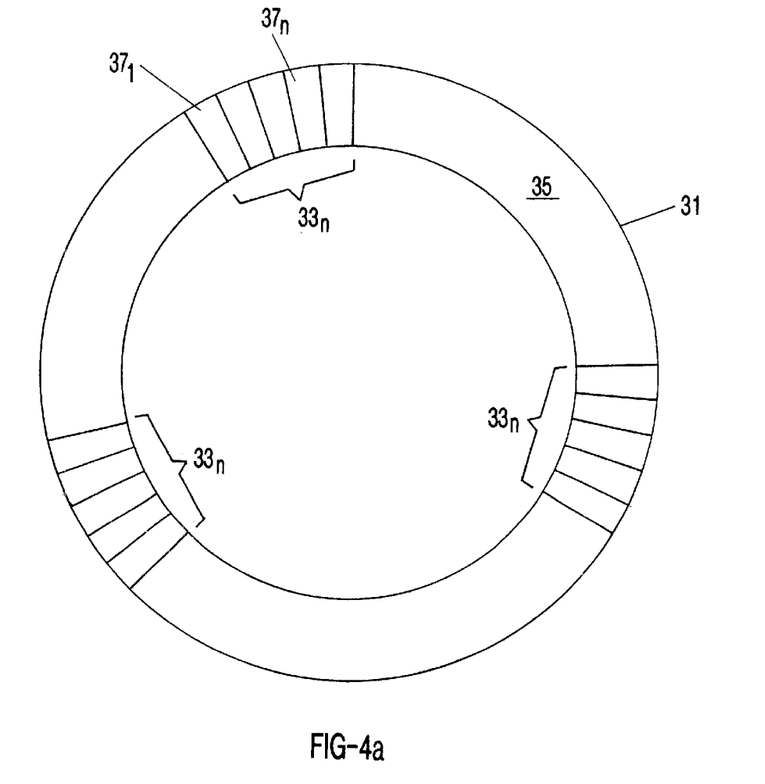
FIG. 4a is an end view of a torque coupler with attached multifaceted target markers, which, when the coupler moves, pass in front of sensor assembly means to provide signals for processing.
Figure 4B:
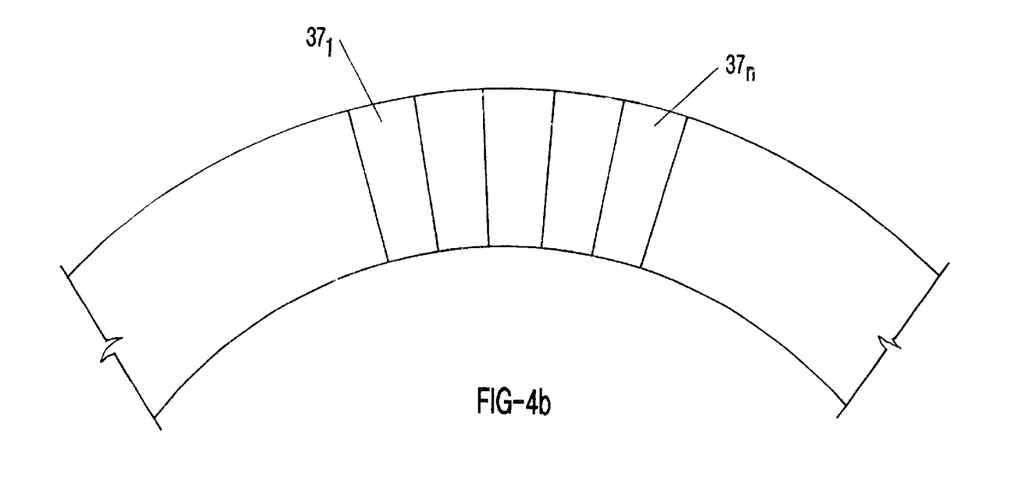
Figure 6:
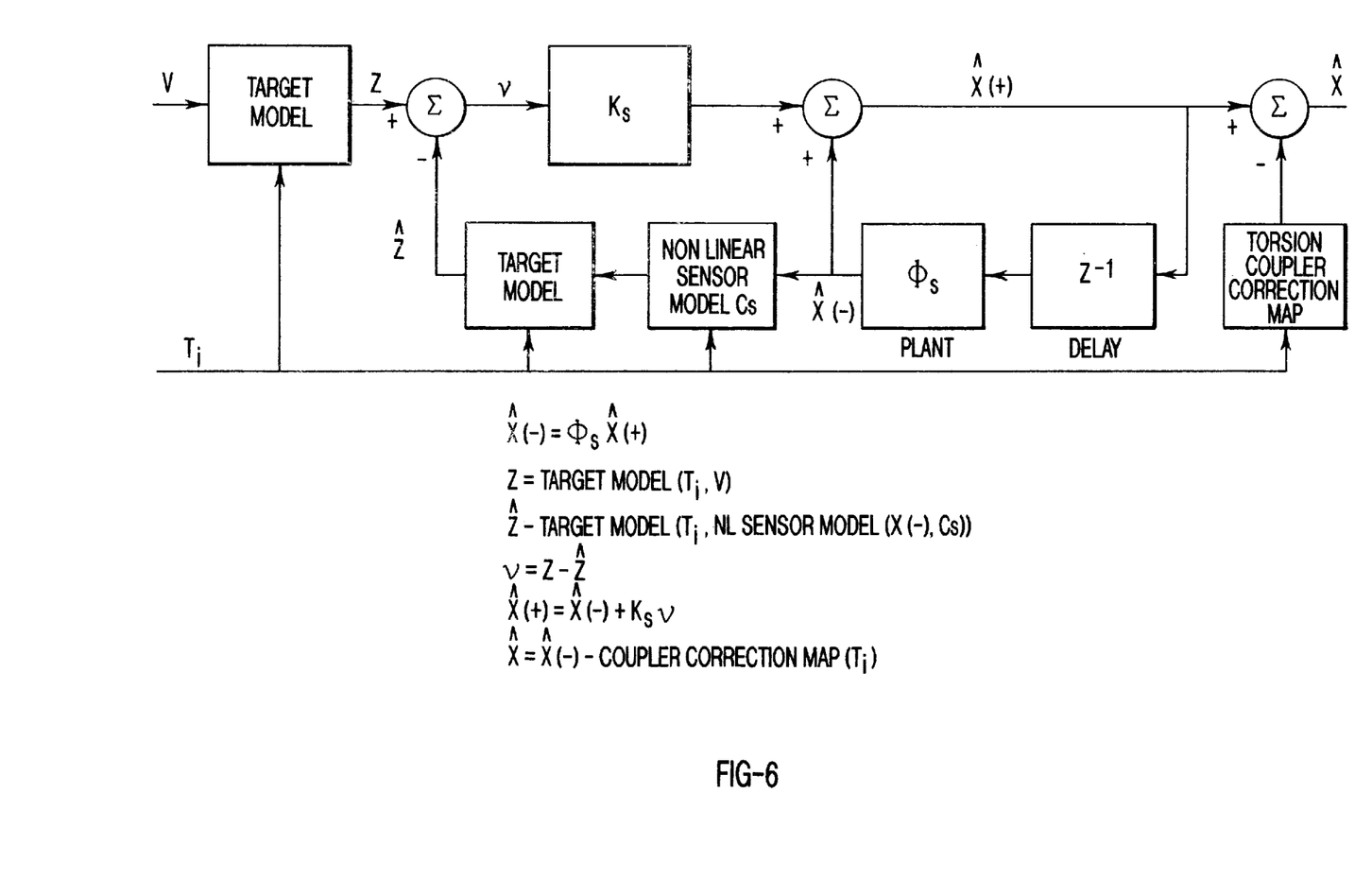
FIG. 6 is a system diagram illustrating a preferred sensor estimator shown in FIG. 5.

At least one multifaceted target marker means $33_n$ is attached to a measured surface 35 of coupler 31 by conventional methods, and are spatially well distributed on surface 35 to allow the determination of the plane of surface 35, which in turn, allows the geometric determination of the angle of the shaft S. Preferably, each target marker means $33_n$ is spaced apart 120 degrees from each other on surface 35. Each target marker means $33_n$ is optically reflective, being able to reflect optical signals transmitted by each sensor $11_n$. In the preferred embodiment, each target marker means $33_n$ is of a predetermined height to an arbitrary center point C, is manufactured from a highly reflective compatible material (such as, for example, nickel-plated aluminum) and includes five faceted faces $37_1$–$37_n$ as seen in FIG. 4a. Using simulations which model the sensor assembly means' $11_n$ performance, it was determined that five facets would optimally allow the recursive sensor estimators (as seen in FIG. 6) to converge to a solution rapidly. The first three facets $37_1$–$37_3$ produce fixed, precise changes in displacement. The fourth facet $37_4$ produces a fixed, precise angle change in the axis of rotation of the coupler 31. The fifth facet $37_5$ produces a fixed, precise angle change in the axis perpendicular to the rotation of the coupler 31. Those of skill in the art will appreciate that many reflective materials could be substituted for the preferred embodiment of the target marker means of the present invention (such as, for example, nickel, aluminum, stainless steel, titanium and first surface or second surface glass mirrors), yet still remain within the spirit and the scope of the present invention. By tracking the location of each facet $37_n$ on surface 35 in space and time, a comparison can be made between measured voltages (which are proportional to the distance to the surface and the surface's angles) and a model of the sensor response for an estimated distance and angles (stored in control electronics 41) in order to calculate the couplers 31 estimated absolute distance from each sensor $11_n$ and also the angle of each target marker means $33_n$ relative to each sensor $11_n$.

The information corresponding to the captured signal reflectance from each sensor assembly means $11_n$ is then communicated via communications bus 43 (such as, for example, a fiber optic data bus or bundle) by the control electronics 41 to the signal processing software means 51. The signal processing software means 51, in turn, is programmed by conventional means to determine whether the moveable shaft S is moving in any plane to within 10 mils over 450 mils and 0.1 degree over 2.5 degrees. Simultaneously, the signal processing software means 51 monitors the rotational speed of shaft S at up to 9000 RPM.

Figure 5:
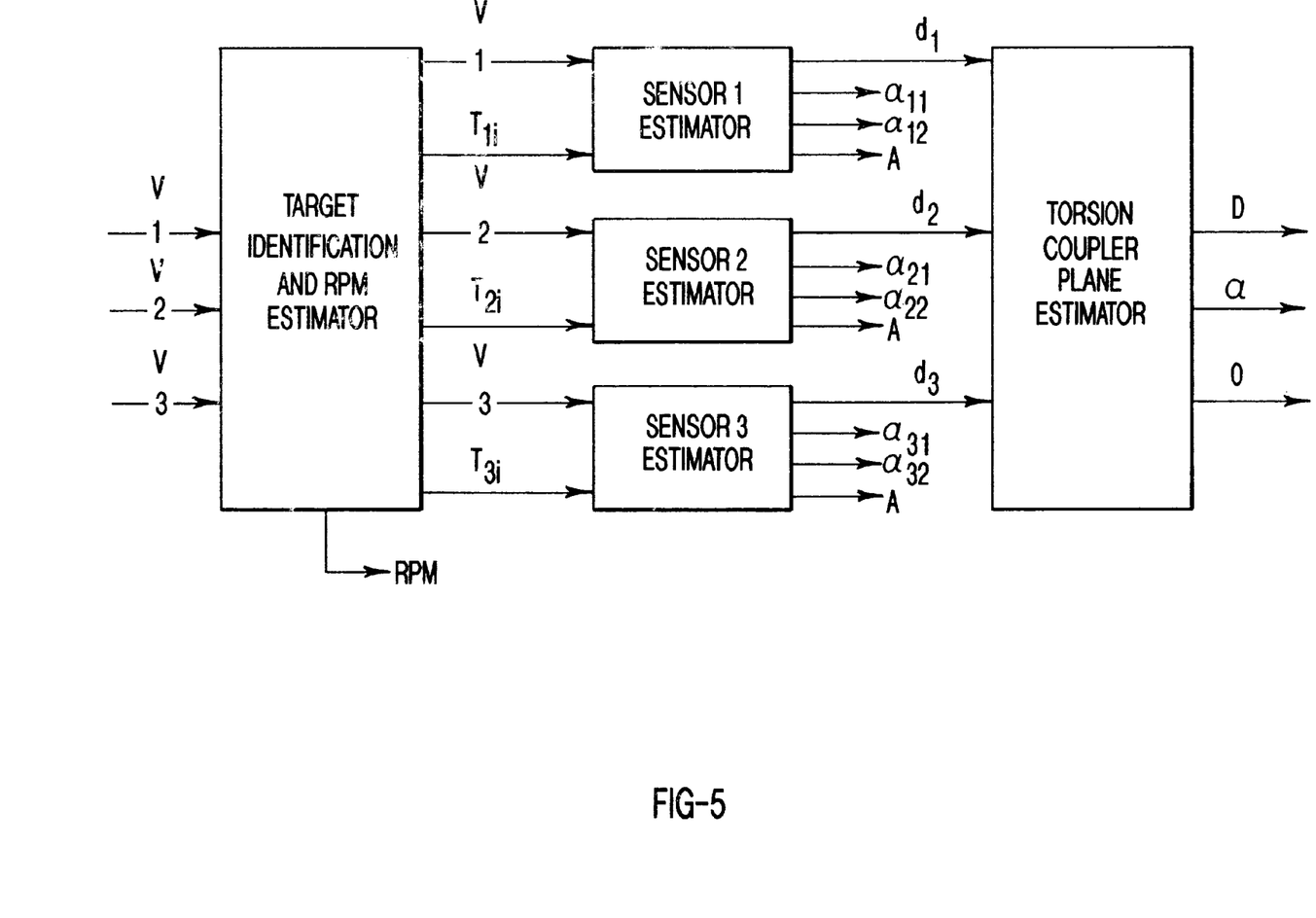
FIG. 5 is a block diagram of the signal processing functions required to derive the coupler attitude information from voltages sensed by the sensor assembly means as each target marker passes each sensor assembly means.

In the preferred embodiment of the present invention, as illustrated in FIG. 5, the signal processing software means 51 includes a target identification and RPM estimator 61, a plurality of sensor estimators $63_n$ corresponding to each sensor assembly means $11_n$ employed, and a torsion coupler plane estimator 65.

In operation, each sensor assembly means $11_n$ generates a continuous signal obtained from reflections from the rim of the coupler 31 as the coupler 31 rotates. In the preferred embodiment of the present invention, the space (or, regions) between each target marker means $33_n$ on the rim of coupler 31 are typically darkened with non-reflective material. Thus, each target marker means $33_n$, as it rotationally passes each sensor, has a much higher return (or, reflected) signal. A small stripe of reflective material (not shown) is optionally placed on the rim of the coupler at a predetermined location to provide a fiducial mark on the rim of the coupler. The stripe provides a reference point for determining the rotational angle of the coupler. When the stripe is sensed by each sensor assembly means $11_n$, it is an indication that the next target market means $33_n$ sensed by the sensor assembly means $11_n$ will be target marker means $33_1$. This will be followed by target marker means $33_2$, $33_3$ up to $33_n$. The target identification and RPM estimator 61 computationally locates the fiducial marker, locates each target marker means, locates each facet of each target marker means, obtains the sensor response of each facet $37_n$ of each target marker means $33_n$ to transmit this data to the sensor estimators $63_n$, and by using the sampling rate of each sensor assembly means $11_n$, determines the rotational velocity of the shaft by the information corresponding to the passage of the fiducial marker on each rotation.

Referring now to FIG. 6, each sensor estimator $63_n$ correlates to each sensor assembly means $11_n$ employed, and computationally generates a distance and two orthogonal angle estimates based on voltages from the five facets $37_{1-375}$ of each of the target marker means $33_n$. In addition, in order accommodate variations in the overall gain of the optics and electronics employed in the present invention, an attenuation parameter is also utilized in each sensor estimator $63_n$. Models of the characteristic responses of each sensor used (e.g., how they respond to predefined target marker means $33_n$) are necessary in order to recursively estimate these parameters and are stored within signal processing software means 51. Such models are derived by known methods of off-line characterization of each sensor assembly means $11_n$ employed.

As illustrated in FIG. 6, each sensor estimator $63_n$ compares the voltage response from each sensor assembly means $11_n$ obtained in response to reflected light from each facet $37_n$ to an estimated voltage measurement (being previously derived from models of the sensor and target), and multiplies the difference by a gain matrix. The gain matrix (being previously derived) should minimally account for the noise, target and sensor characteristics. The result is applied to the previous estimate of the state and a new estimate is produced. This new estimate of distance, angle, and attenuation is applied to the non-linear sensor model and subsequently, the target model to generate the next measurement estimate.

Figure 7:
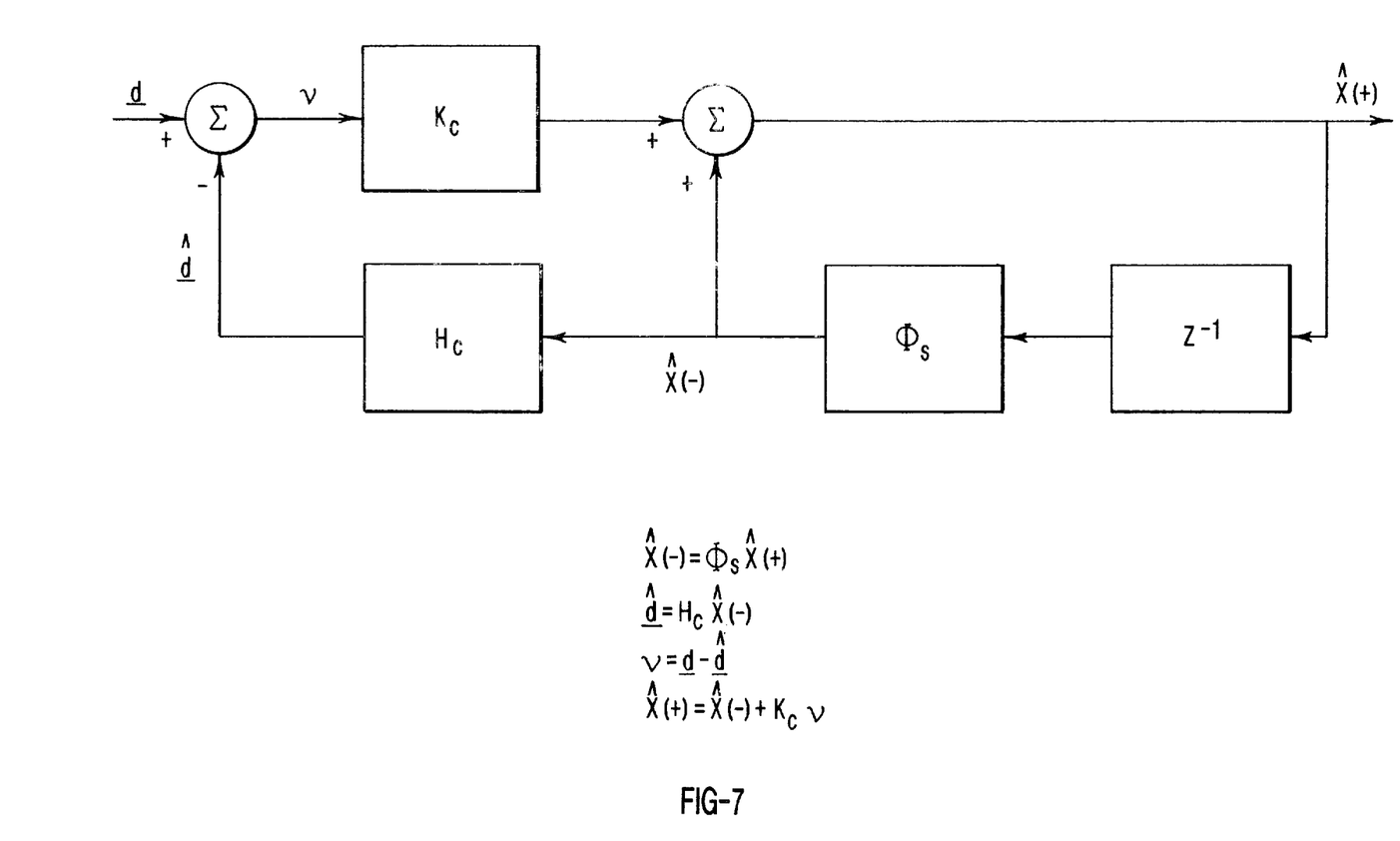
FIG. 7 is a system diagram illustrating a preferred torsion coupler plane estimator shown in FIG. 5.

Torsion coupler plane estimator 65 takes three precise distances from the sensor estimators $63_n$ and uses these distances to determine the attitude of the coupler's 31 plane via a recursive Kaman estimator which is similar in form to that of the sensor estimators. Those skilled in the art will note that there are several methods to accomplish this method, however, the recursive Kaman estimator is preferred because it allows readings for the coupler plane to be continuously generated.

In the preferred embodiment, the signal processing software means is programmed to obtain the desired information in MatLab and Mathmatica by methods known to those of skill in the art. These software programming languages were used for prototype expediency, but those of skill in the art will appreciate that other methods may be used (such as, for example, by hardware means such as preprogrammed ASICS or by embedding the software in microcontrollers). Because each target marker means $33_n$ is coupled to the moveable coupler, the present non-invasive optical distance and angle measurement system allows collection of measurements multiple times per revolution in order to calculate the precise attitude, speed and torque of the moveable shaft S. As will now be appreciated by those of skill in the art, obtaining multiple measurements is especially useful in those applications where the measured surface or plane is not truly flat, and multiple measurements may help in mapping the uneven surface to an idealized coupler surface.

Further, the signal processing software means 51 is programmed to used the information from the reflected optical signals to automatically determine shaft characteristics, despite the conditions of the surrounding environment, by non-linear estimation of absolute displacement of shaft S and angular displacement of shaft S by light returned from the target marker means $33_n$. For example, the gradient of the reflected light intensity is influenced by many factors such as air quality: humidity, temperature, unexpected obstructions (including dust particles), the reflective quality of the target's surface, the light source's intensity and operational characteristics, and the angle of incidence on the target. Thus, in the preferred embodiment of the present invention, the signal processing software means 51 further includes signal processing means for providing an adaptive gain to accommodate variations in the optical path, sense electronics or fiber bundle variations.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a non-invasive precision, optical distance and angle measurement system, is followed.

What is claimed is:

1. A system for measuring an absolute optical distance and planar angle relative to a plurality of optical sensor assembly means for a shaft assembly, the shaft assembly including a movable shaft coupled to a rotatable torque coupler, the system comprising:

a mounting structure affixed adjacent to the shaft assembly;

the plurality of optic sensor assembly means disposed upon the mounting structure;

at least one target marker means comprising a plurality of faceted faces coupled to a surface portion of the shaft assembly;

control electronics, each optic sensor assembly means in communication with the control electronics by a communications bus; and signal processing software means loaded and stored in the control electronics; each optic sensor assembly means transmitting optical signals to the surface portion, receiving a reflected optical signal from each target marker means as each target marker means passes each optic sensor assembly and transmitting information corresponding to characteristics of the shaft to the control electronics for processing by the signal processing software means.

2. The invention of claim 1 wherein each sensor assembly means is proximately located between 0.15 and 0.4 inches away from the surface portion.

3. The invention of claim 2 wherein each sensor assembly means is disposed on the mounting structure equidistantly from adjacent sensor assembly means.

4. The invention of claim 3 wherein each sensor assembly means is a sensor selected from the group consisting of a fiber optic concentric ring-type sensor, an incandescent sensor, a coherent light sensor, a noncoherent light sensor or a multiple wavelength sensor.

5. The invention of claim 1 wherein the plurality of sensor assembly means comprise three sensor assembly means.

6. The invention of claim 5 wherein each target marker means is spatially well distributed upon the surface portion.

7. The invention of claim 1 wherein the signal processing software means further includes a target identification and RPM estimator, a sensor estimator corresponding to each sensor assembly means, and a surface portion plane estimator; the target identification and RPM estimator computationally locating each target marker means, computationally locating each facet of each target marker means to obtain a reflective response and determining the rotational velocity of the surface portion; each sensor estimator computationally generating distances to the surface portion and at least two orthogonal angle estimates from a voltage response of each optic sensor assembly; the surface portion plane estimator computationally obtaining the distances to determine a two dimensional planar angel of the surface portion.

8. The invention of claim 7 wherein each target marker means further includes a first facet, a second facet, a third facet, a fourth facet and a fifth facet, the reflected optical signal from the first, second and third facets corresponding to an angular displacement of the shaft, the reflected optical signal from the fourth facet corresponding to an angular change in an axis of the surface portion's movement and the reflected optical signal from the fifth facet corresponding to an angular change in the surface portion's axis perpendicular to the movement of the surface portion.

9. The invention of claim 8 wherein each target marker means is formed of a material selected from the group consisting of nickel-plated aluminum, nickel, aluminum, stainless steel or titanium.

10. The invention of claim 9 wherein each target marker means is formed of a material selected from the group consisting of first surface glass mirrors or second surface glass mirrors.

11. A non-contact optical distance and planar angle measurement means for a moveable shaft assembly, the shaft assembly including a torque coupler, the system comprising:

a structure surrounding and adjacent to the torque coupler;

at least two fiber optical means for sensing disposed upon the structure and proximate to the torque coupler;

at least one means for marking comprising a plurality of faceted faces coupled to a surface of the torque coupler;

means for electronically controlling in communication with each fiber optical means for-sensing by a bus; and means for software signal processing loaded and stored in the means for electronically controlling; each means for sensing transmitting optical signals to the surface portion, receiving a reflected optical signal from each means for marking as each means for marking passes fiber optical means and transmitting data correlating to characteristics of the shaft to the means for electronically controlling for processing by the means for software signal processing.

12. The optical distance and planar angle measurement system of claim 11 wherein each means for sensing is disposed on the structure equidistantly from an adjacent fiber optical means.

13. The optical distance and planar angle measurement system of claim 12 wherein each means for sensing is proximately located between 0.15 and 0.4 inches away from the surface portion.

14. The optical distance and planar angle measurement system of claim 13 wherein each means for sensing is a sensor selected from the group consisting of a fiber optic concentric ring-type sensor, an incandescent sensor, a coherent light sensor, a noncoherent light sensor or a multiple wavelength sensor.

15. The optical distance and angle measurement system of claim 14 wherein three means for sensing are equidistantly disposed upon the structure surrounding and adjacent to the torque coupler.

16. The optical distance and planar angle measurement system of claim 15 wherein each means for marking is equidistantly distributed upon the surface portion.

17. The optical distance and planar angle measurement system of claim 11 wherein the means for software signal processing further includes a target identification and RPM estimator, a plurality of sensor estimators corresponding to each means for sensing, and a torsion coupler plane estimator; the target identification and RPM estimator computationally locating each means for marking, computationally locating each facet of each means for marking to obtain a response and determining the rotational velocity of the torque coupler; each sensor estimator computationally generating distances to the torque coupler and at least two orthogonal angle estimates from a voltage response of each means for sensing; the torsion coupler plane estimator computationally determining the attitude of the coupler.

18. The optical distance and planar angle measurement system of claim 17 wherein each means for marking further includes a first facet, a second facet, a third facet, a fourth facet and a fifth facet, the reflected optical signal from the first, second and third facets corresponding to an angular displacement of the shaft, the reflected optical signal from the fourth facet corresponding to an angular change in an axis of the coupler's rotation and the reflected optical signal from the fifth facet corresponding to an angular change in the coupler's axis perpendicular to the movement of the coupler, the angular displacement of the shaft, the angular change in an axis of the coupler's movement and the angular change in the coupler's axis perpendicular to the movement of the coupler being the characteristics of the shaft.

19. The optical distance and planar angle measurement system of claim 18 wherein each means for marking is formed of a material selected from the group consisting of nickel-plated aluminum, nickel, aluminum, stainless steel or titanium.

20. The optical distance and planar angle measurement system of claim 19 wherein each means for marking is formed of a material selected from the group consisting of first surface glass mirrors or second surface glass mirrors.

21. A method for measuring absolute distance and planar angles for a shaft assembly relative to on optic sensor assembly means, the method comprising the steps of:

mounting a structure adjacent to the shaft assembly;

locating at least one optic sensor assembly means upon the mounting structure;

coupling at least one target marker means wherein the target marker means comprises a plurality of faceted faces to a surface portion of the shaft assembly;

using control electronics to communicate with each optic sensor assembly by a communications bus, each optic sensor assembly means transmitting optical signals to the surface portion, receiving a reflected optical signal from each target marker means as each target marker means passes each optic sensor assembly means, generating information corresponding to characteristics of the shaft and transmitting the information to the control electronics; and allowing signal processing software means, loaded and stored in the control electronics, to receive the information from the control electronics for processing.

22. The method of claim 21 wherein each sensor assembly means is proximately located between 0.15 and 0.4 inches away from the surface portion.

23. The method of claim 22 wherein each target marker means is spatially well distributed upon the surface portion.

24. The method of claim 23 wherein the step of generating information corresponding to characteristics of the shaft further includes the steps of generating information corresponding to an angular displacement of a shaft in the shaft assembly, generating information corresponding to an angular change in an axis of the shaft assembly's movement and generating information corresponding to an angular change in the shaft's axis perpendicular to the rotation of the shaft.

25. The system of claim 23 wherein each sensor means is proximately located between 0.15 and 0.4 inches away from the surface portion and wherein each reflective means is spatially well distributed upon the surface portion.

26. The system of claim 24 wherein the information corresponds to an angular displacement of the shaft in the shaft assembly, to an angular change in an axis of the shaft's displacement and to an angular change in the shaft's axis perpendicular to the displacement of the shaft.

27. A distance and planar angle measurement system for a shaft assembly having a moveable shaft, comprising:

a structure mounted to the shaft assembly, the structure surrounding the shaft and disposed adjacent to the shaft;

at least one fiber optic sensor means coupled to the mounting structure, each sensor means disposed on the structure equidistantly from adjacent sensor means;

at least one reflective means coupled to a surface portion of the shaft wherein the at least one reflective means comprises a plurality of faceted faces;

control electronic means in communication with each sensor means by a communications bus, each sensor means transmitting signals to the surface portion, receiving at least one reflected signal from each reflective means as each reflective means passes each sensor means, generating information corresponding to characteristics of the shaft and transmitting the information to the control electronics; and software means, loaded and stored in the control electronics, to receive the information from the control electronic means for processing.

* * * * *